United States Patent Office 2,893,817
Patented July 7, 1959

2,893,817
DIAZOAMINO COLORING COMPOSITIONS ADAPTED FOR NEUTRAL STEAM DEVELOPMENT

Pierre Petitcolas, Rouen, Andre Paul Richard, Oissel, Robert Frederic Michel Sureau, Enghien, Rene Pierre Victor Roe, Rouen, and Jean Ernest Develotte, St. Etienne-du-Rouvray, France, assignors to Compagnie Francaise des Matieres Colorantes, Paris, France, a corporation of France No Drawing. Application June 10, 1957
Serial No. 664,457

Claims priority, application France June 11, 1956

10 Claims. (Cl. 8—71)

The present invention concerns improvements in colouring compositions and in the colouration of materials therewith. This application is a continuation-in-part of applications Serial No. 464,912, filed October 26, 1954, and Serial No. 308,696, filed September 9, 1952, both abandoned.

The preparation of diazoamino compounds which are soluble in water has been the object of very many patents. These compounds in fact are used in admixture with the most diverse coupling components for the formation of insoluble dyestuffs on textile fibres.

The progress which has so far been realized has related particularly to the rapidity of formation of insoluble dyestuffs by acid steaming or by passage of printed fabrics into an acid bath as well as to the extension of the diazotizable bases used.

The inconveniences of the use of acetic acid, formic acid or mixtures of these two acids, such as the attack on the apparatus, the small yield or precipitation of the "Naphthol AS" in crystals, and coupling with difficulty if the temperature or the duration of passage in an acid atmosphere are insufficient, are well known.

These inconveniences have been partially suppressed by the incorporation in the printing pastes of volatile amines, such as diethylaminoethanol. The use of these amines, usually in large quantities, increases very noticeably the net cost of the printing so that numerous firms, not having recourse to acid development, still use the mixtures of anti-diazotates and coupling components, which can be developed in neutral steam, although the tints obtained are duller than those that may be obtained by the use of diazoamino derivatives.

According to the present invention it has been found that insoluble azo dyestuffs can be obtained on fibres without having recourse to acid steaming by applying on the fibre a mixture of a coupling component with a water-soluble salt of a diazoamino derivative having the following general formula:

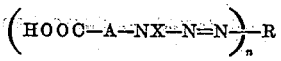
(I)

and developing the dyestuff by neutral steaming. In the above general formula A represents a member selected from the group consisting of the unsubstituted o-phenylene group, the halogen substituted o-phenylene group, the alkyl substituted o-phenylene group, and the alkoxy substituted o-phenylene group, X represents a member selected from the group consisting of unsubstituted alkyl and cycloalkyl radicals, and alkyl and cycloalkyl radicals substituted by a member selected from the group consisting of the —OH, —OCH₃, —OC₂H₅, —COOH, —SO₃H, —COO alkyl, and —CONH₂ groups, n represent a positive integer from 1 to 2 and R represents the radical of an aromatic amine having a more strongly basic character than 2:5-dichloroaniline. The water-soluble salts of the diazoamino derivatives of Formula I which may be used in accordance with the invention and of which the benzene nucleus is not substituted by halogen atoms or by alkyl or alkoxy groups can be prepared according to the process described in our co-pending patent application No. 308694 of even date now Patent No. 2,858,301. The water-soluble salts of the diazoamino derivatives of Formula I in which, on the contrary, the benzene nucleus A is substituted by one or more atoms of halogen or by one or more alkyl or alkoxy groups can be obtained according to a similar process, that is to say, by causing diazo or tetrazo derivatives of mono- or diamines having a more markedly basic character than 2:5-dichloraniline to react, in a non-acid medium, on N-substituted derivatives of anthranilic acid of the general formula:

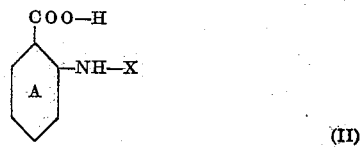
(II)

wherein the benzene nucleus A is substituted by one or more atoms of halogen, or by one or more alkyl or alkoxy groups and wherein X has the same significance as above. These latter diazoamino derivatives can be isolated from the reaction medium, for example, by the addition of caustic alkali or sodium chloride, or a mixture of these two products in accordance with the process described in our patent, No. 2,673,374, issued April 13, 1954. After drying at a moderate temperature under vacuum, they possess a very good stability to storage.

Amongst the N-substituted derivatives of anthranilic acid of Formula II which may be used for the preparation of this second category of diazoamino derivatives, may be mentioned, by way of example, 5-chloro-2-hydroxyethylamino-benzoic acid, 5-bromo-2-hydroxyethylamino-benzoic acid, 4-chloro-2-hydroxyethylamino-benzoic acid, N-(2-carboxy-3-chlorophenyl)-glycine, N-(2-carboxy-4-chlorophenyl)-glycine, N-(2-carboxy-4 - bromophenyl)-glycine, N-(2-carboxy-5-chlorophenyl)-glycine, N-(2-carboxy-4:6-dichlorophenyl)-glycine, N-(2-carboxy-3:6 - dichlorophenyl)-glycine, N-(2-carboxy-3:4 - dichlorophenyl)-glycine, N-(2-carboxy-5-methoxyphenyl)-glycine, N-(2-carboxy-4-methoxyphenyl)-glycine, N-(2'-hydroxy-3'-sulpho-propyl)-5-chloro-2-amino-benzoic acid, and N-(2'-carboxy-4'-chlorophenyl)-β-amino-propionic acid.

When these acids are substituted in the position para to the NH group the diazoamino compounds derived therefrom have the advantage that they are not able to give rise at the moment of their application to the fibre to dyestuffs of the formula:

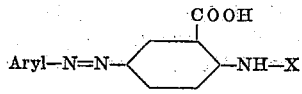

in which X has the same significance as above.

The coupling components capable of being used for carrying out the present invention are, for example, the arylides of the orthohydroxy-carboxylic acids such as 2:3-hydroxy-naphthoic acid, 2:3-hydroxy anthracene-carboxylic acid, 2:3-hydroxycarbazole-carboxylic acid, 2:3-hydroxy benzocarbazole-carboxylic acid, 2:3-hydroxy diphenylene-oxide-carboxylic acid, acylacetic acids such as acetylacetic, benzoyl acetic, terephthaloyl bis-acetic acids and certain hydroxy-azo dyestuffs.

The mixture of the water-soluble salts of the diazoamino derivatives of Formula I with the coupling components in the form of alkali salts have a very good stability to storage. They can be applied, for example, by printing on fabrics of natural or regenerated cellulose. The development of the colour is effected in a neutral atmosphere, for example, by neutral steaming, without its being necessary to add volatile amines to the printing pastes. In fact, these salts of diazoamino derivatives are capable of splitting very rapidly by simple hydrolysis in an alkaline medium.

For this application to the fabric it suffices to dissolve these mixtures in dilute alkalis, with or without the addition of an alcohol and a dyeing assistant, to paste with a thickener, such as starch-tragacanth, to print on a cellulosic fabric, and to treat in a Mather-Platt with neutral steam for a few minutes. The development of the colour is very rapid and is effected without the addition of volatile amines to the printing paste. This great aptitude of the diazoamino derivative for hydrolysis allows, if it is desired to use acid steam, of very great rapidity of work, since the development is practically complete in 30 seconds or a minute.

The printing pastes are stable and can be kept without noticeable decomposition for several weeks.

The invention will be more clearly understood by reference to the following examples which are purely illustrative. The parts by weight and the parts by volume designate units of weight and of volume corresponding to the same quantity of water. Unless there is an indication to the contrary all parts are by weight.

Example 1

96 parts by weight of the diazoamino derivative obtained by the condensation of the diazotized 5-chloro-2-amino-1-methylbenzene with N-(2-carboxyphenyl)-glycine according to the method of Example 1 of our co-pending patent application No. 308,694 of even date, now Patent No. 2,858,301, are mixed intimately with 67 parts by weight of the 4'-methoxy-2'-methyl-anilide of β-hydroxynaphthoic acid and 18 parts by weight of anhydrous sodium sulphate.

A printing paste is prepared from this mixture by pasting and dissolution, the printing paste having the following composition:

|  | Gr. |
|---|---|
| Mixture indicated above | 40 |
| 32.5% caustic soda (38° Bé.) | 15 |
| Sulphoricinate of sodium | 30 |
| Neutral thickener of starch-tragacanth | 500 |
| Water | 415 |
|  | 1000 |

A cotton fabric is printed with this paste, and it is steamed in a Mather-Platt for 6-7 minutes. It is soaped and rinsed, and red prints are obtained which are very rich and of excellent properties. In place of passing through the Mather-Platt, the fabric can even be left after printing for 24 hours at ordinary temperatures, then soaped and practically identical red prints are obtained. If it is desired to use acid steaming, it will suffice to pass the fabric into vapours of acetic and formic acids for 30 seconds to obtain a complete development. The keeping qualities of the printing pastes thus prepared are very good.

By replacing the 4'-methoxy-2'-methyl-anilide of β-hydroxy-naphthoic acid by an equivalent quantity of 4-chloro-2:5-dimethoxy-aceto-acetylamino-benzene, yellowish-green prints of a very great purity are obtained under the same conditions of pasting, printing and neutral or acid steaming as above.

Example 2

78 parts by weight of the diazoamino compound obtained by the condensation of diazotized 4-chloro-2-amino-1-methyl-benzene with N-(2-carboxyphenyl)-glycine according to the method of Example 2 of the patent application mentioned above in the state of 100% disodium salt, and which corresponds to the following formula:

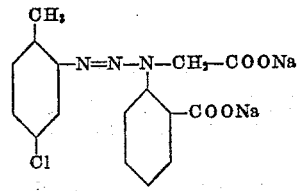

are mixed with 60.4 parts by weight of the 2'-ethoxy-anilide of β-hydroxynaphthoic acid in the state of the free acid or with 66 parts by weight of the same anilide of β-hydroxy-naphthoic acid in the state of its sodium salt.

By preparing as in the foregoing example a printing paste containing 40 gr. of this mixture per kilogramme, by printing it on a cotton fabric, and by steaming for 6-7 minutes in neutral steam in a Mather-Platt, very bright scarlet prints are obtained. A practically complete development is obtained, identical with the neutral steam development, if the fabric is allowed to stand for 24 hours at ordinary temperature, or by submitting it to acid steaming for 30 seconds.

If the 2'-ethoxy-anilide of β-hydroxy-naphthoic acid is replaced by the 2'-methyl-anilide of the same acid, very bright and very intense red prints are obtained by operating under the same conditions.

By the use of 38 parts by weight of diacetoacetyl-tolidine, or 63.6 parts by weight of 2-acetoacetyl-amino-6-ethoxy-benzothiazole with the same quantity of diazoamino derivative as above, one obtains very beautiful yellow prints.

Example 3

74.4 parts by weight of the 100% tetrasodium salt of the diazoamino derivative obtained by the condensation of tetrazotized dianisidine with N-(2-carboxyphenyl)-glycine according to the method of Example 3 of the above-mentioned patent application, are mixed with 52.6 parts by weight of the anilide of β-hydroxy-naphthoic acid; after dissolution and pasting with starch-tragacanth under the same conditions as in the foregoing examples, very rich navy blue shades are obtained after printing, followed by neutral steaming in a Mather-Platt. An acid steaming for 30 seconds leads to the same result.

Example 4

By mixing in equimolecular quantities the diazoamino derivative resulting from the condensation of diazotized m-chloraniline with N-(2-carboxyphenyl)-glycine according to the method of Example 4 of the above-mentioned patent application, with the 2'-methyl-anilide of β-hydroxy-naphthoic acid, and preparation of a printing paste under conditions identical with those of the foregoing examples, bright orange prints with an excellent tinctorial yield are obtained by neutral steaming.

Example 5

41 parts by weight of the diazoamino derivative obtained in the form of 100% disodium salt by the condensation of diazotized 4-chloro-2-amino-1-methoxy-benzene with N-(2-carboxyphenyl)-glycine according to the method of Example 5 of the above-mentioned patent application, are mixed with 29.5 parts by weight of the 2'-methoxy-anilide of β-hydroxy-naphthoic acid. A cotton fabric is printed with a paste containing 40 gr. of this mixture to the kilogramme and prepared as in Example 1, submitted to a neutral steaming for 6-7 minutes in a Mather-Platt, and prints of a bluish red shade which are very bright and very rich are obtained after the usual treatments.

It suffices, moreover, to allow the printed fabric to stand for 24 hours to obtain shades practically identical with those obtained in the Mather-Platt. The keeping qualities of the printing paste are excellent.

By replacing the 2′-methoxy-anilide of β-hydroxy-naphthoic acid by acetoacetyl-p-phenetidine bright yellow prints can be obtained by neutral steaming. If 4-benzoyl-amino-1-benzoyl-acetylamino - 2:5 - dimethoxy-benzene is used, a clear, very rich yellow is obtained. With the 4′-chloro-anilide of 2-hydroxy-carbazole-3-carboxylic acid, rich brown prints are obtained by neutral steaming in a Mather-Platt. An acid steaming of 30 seconds suffices to obtain a complete development. The keeping qualities of the printing pastes are very good, and the prints thus obtained are of excellent fastness.

*Example 6*

50 parts by weight of the diazoamino derivative containing 28% of 4-chloro-2-amino-1-methyl-benzene and resulting from the condensation of diazotized 4-chloro-2-amino-1-methyl-benzene with N-hydroxy-ethyl-anthranilic acid according to the method of Example 14 of the above-mentioned patent application are mixed with 41 parts by weight of the 80% sodium salt of the o-phenetidide of β-hydroxy-naphthoic acid.

10 gr. of this mixture are formed into a paste with 10 cc. of denatured alcohol, and 4.5 gr. of a 35° Bé. solution of caustic soda. 50 cc. of warm water are added and the mixture is ground with 120 gr. of neutral tragacanth thickener. A cotton fabric is printed with this paste. After printing, it is dried and developed for 3–4 minutes in neutral steam in a Mather-Platt and treated for several minues in a boiling soap bath made alkaline with sodium carbonate. In this way a bright scarlet print is obtained substantially the same as that obtained by steaming for a minute in the presence of formic and acetic acids. By replacing the sodium salt of the o-phenetidide of β-hydroxy-naphthoic acid by the corresponding quantity of the ortho-toluidide of the same acid and operating as above, bright yellowish red prints are obtained.

*Example 7*

12.8 parts by weight of o-chloraniline are dissolved in 100 parts of water and 15 parts by volume of concentrated HCl under the action of heat. The solution is allowed to cool, a further 15 parts by volume of HCl are added, then ice, and it is diazotized at 5–10° C. with 14 parts by volume of a 50% NaNO₂ solution by volume. The solution of the diazo compound is allowed to flow, in 10 minutes, under the surface of the liquid of a solution made from 23 parts by weight of 5-chloro-2-hydroxy-ethylamino-benzoic acid, 100 parts of water and 35 parts by weight of anhydrous sodium carbonate. The diazo compound disappears almost instantaneously. The product is slowly made alkaline with 10 parts by volume of 48° Bé. caustic soda, until a definite reaction is obtained on thiazole yellow paper. The mixture is salted out with 50 parts by weight of sodium chloride and the volume is doubled by the addition of 24° Bé. brine. The diazoamino derivative collects in the form of an oil which crystallizes well after some hours stirring at ordinary temperature. The crysals are filtered, pressed and dried under vacuum at a moderate temperature.

The 5-chloro-2-hydroxyethylamino-benzoic acid used may be prepared by the condensation of monoethanolamine with 2:5-dichlorobenzoic acid.

30 parts by weight of the dried diazoamino derivative, titrating 30% of base of molecular weight 125.5, are mixed with 28 parts by weight of the sodium salt of the anilide of β-hydroxy-naphthoic acid, titrating 72%.

10 gr. of this mixture are formed into a paste with 10 cc. of denatured alcohol and 5 gr. of 35° Bé. solution of caustic soda. 50 cc. of warm water are added and the printing paste obtained with 120 gr. of 10% neutral starch-tragacanth thickener. This paste is printed on a cotton fabric as in Example 6. After finishing, a very rich bright orange shade is obtained.

*Example 8*

25 parts by weight of 1-amino-4-benzoylamino-2-methoxy-5-methyl-benzene are formed into a paste with 100 parts of water and 14 parts by volume of a 50% solution of sodium nitrite. The quite homogeneous paste is poured into a mixture consisting of 100 parts of water, 30 parts by volume of concentrated HCl and ice, so that the final temperature does not exceed 10° C.

After filtration, the solution of the diazo compound is introduced drop by drop, under the surface of the liquid, into a solution prepared from 25 parts by weight of 5-chloro-2-hydroxyethyl-amino-benzoic acid, 200 parts of water and 36 parts by weight of anhydrous sodium carbonate. The operation is effected at 18–20° C. and 15 parts by volume of a 48° Bé. solution of caustic soda are allowed to flow in at the same time as the solution of the diazo compound so as to neutralize the sodium bicarbonate formed, without at any time attaining neutrality to thiazole yellow paper. After the addition of about a quarter of the solution the diazoamino derivative begins to crystallize out. After the addition of all the diazo compound, the mass is rendered sharply alkaline by the addition of 5 parts by volume of a 48° Bé. solution of caustic soda, it is salted out with 50 parts by weight of sodium chloride, filtered, pressed and dried under vacuum at a moderate temperature.

20 parts by weight of the dried diazoamino derivative, titrating 40% of base of molecular weight 256, are mixed intimately with 11 parts by weight of the sodium salt of the anilide of β-hydroxy-naphthoic acid and 5 parts by weight of sodium benzenesulphonate. 10 gr. of this mixture are formed into a paste with 10 cc. of denatured alcohol and 5 gr. of a 35° Bé. solution of caustic soda. 50 cc. of warm water and 120 gr. of neutral thickener (10% starch-tragacanth) are added. The paste so formed is printed on a cotton or rayon fabric, dried and developed in neutral steam for 2 to 3 minutes in a Mather-Platt. After soaping for a few minutes in a boiling bath containing 2 gr. of soap and 1 gr. of sodium carbonate per litre, very rich violet prints are obtained. By developing in acid steam no superior tinctorial yield is obtained.

*Example 9*

27.6 parts by weight of 6-chloro-1-amino-4-benzoyl-amino-3-methoxy-benzene are formed into a paste with 200 parts of water and 14 parts by volume of a 50% by volume solution of sodium nitrite. The homogeneous paste is allowed to flow into an energetically stirred mixture of 100 parts of water and 20 parts by volume of concentrated hydrochloric acid. The final temperature is 15° C. It is stirred for half an hour to complete the dissolution, filtered and allowed to flow, drop by drop, in 20 minutes, under the surface of the liquid of a solution prepared from 25 parts by weight of 5-chloro-2-hydroxy-ethylamino-benzoic acid, 200 parts of water, and 35 parts by weight of Na₂CO₃. Towards the end of the introduction, when it is found that the diazo compound is absorbed more slowly, 14 parts by volume of a 48° Bé. solution of caustic soda are allowed to flow in little by little, to neutralize the sodium bicarbonate formed. When the diazo compound has totally disappeared, the flow of caustic soda is finished and the mixture is made clearly alkaline with 5 parts by volume of 48° Bé. caustic soda. The compound collects in a pastry form and its precipitation is effected with 50 parts by weight of common salt. The solution can be eventually decanted from the pasty mass and the latter taken up by saturated brine made alkaline by a little caustic soda. The product disintegrates rather rapidly, giving well formed crystals, which are filtered, pressed, and dried at a moderate temperature. The yield is very good.

By mixing the diazoamino derivative thus obtained with alkaline salts of arylides of β-hydroxy-naphthoic acid and preparing printing pastes as indicated in the foregoing examples, a whole range of corinth shades is obtained by development in neutral steam in a Mather-Platt.

If 5-chloro-2-hydroxyethylamino-benzoic acid, is replaced by 4-chloro-2-hydroxyethylamino-benzoic acid, identical results are obtained. The 4-chloro-2-hydroxyethylamino-benzoic acid used may be obtained by condensation of monoethanolamine with 2:4-dichlorobenzoic acid.

Example 10

The diazoamino derivative obtained by the condensation of diazotized 1-amino-4-benzoylamino-2-chloro-5-methoxybenzene with N-hydroxyethyl-anthranilic acid according to the method of Example 15 of the above-mentioned patent application gives, on printing, similar results to those of Example 9.

Example 11

12.2 parts by weight of dianisidine are dissolved at 60–70° C. in 250 parts of water and 12 parts by volume of concentrated hydrochloric acid. 18 parts by volume of HCl and ice are added, then 14 parts by volume of 50% sodium nitrite solution are rapidly added. The final temperature is 5° C. After half an hour's stirring, the tetrazo compound formed is filtered, and introduced, drop by drop, in about 1 hour, into a solution kept at about 15° C. and prepared starting with 25 parts by weight of 5-chloro-2-hydroxyethylamino-benzoic acid, 200 parts of water and 35 parts by weight of $Na_2CO_3$. The tetrazo compound is well absorbed and towards the end of the flow, one commences to introduce 14 parts by volume of 48° Bé. caustic soda solution. When all the solution of the tetrazo compound has been introduced, 5 parts by volume of 48° Bé. solution of caustic soda are added and the compound is precipitated by means of 100 parts by weight of sodium chloride. The mixture is stirred for several hours at ordinary temperature and the crystals are filtered, pressed well and dried under vacuum at a modeate temperature.

10 parts by weight of the diazoamino derivative thus obtained, titrating 26.5% of dianisidine, are mixed with 7.7 parts by weight of the 80% sodium salt of the anilide of β-hydroxy-naphthoic acid. 10 gr. of this mixture are made into a paste with alcohol, caustic soda and starch-tragacanth in the same conditions as in the foregoing examples. The printing and development are effected in the same manner as above, and, after the usual finishing, intense navy blue shades are obtained, both by development in neutral steam and by development in acid steam.

The properties of the diazoamino derivative resulting from the condensation of tetrazotized dianisidine with N-hydroxyethyl-anthranilic acid according to the method of Example 16 of the above-mentioned patent application are substantially identical with those of the foregoing product.

Example 12

15.8 parts by weight of 4-chloro-2-amino-1-methoxy-benzene are melted in 100 parts of hot water. The suspension thus obtained is poured into 30 parts by volume of concentrated HCl and 100 parts of cold water energetically stirred. The temperature is brought down to 5–10° C. with ice, and the substance is diazotized with 14 parts by volume of 50% $NaNO_2$ solution by volume. It is filtered after half an hour, and allowed to flow, in half an hour, under the surface of the liquid of a solution kept at about 15° C. containing 25 parts by weight of 5-chloro-2-hydroxyethylamino-benzoic acid, 200 parts of water, and 35 parts by weight of anhydrous sodium carbonate.

When all the diazo compound has been absorbed, 20 parts by volume of a 48° Bé. solution of caustic soda are added, and the product is salted out with 50 parts by weight of sodium chloride. The diazoamino derivative is precipitated at first in a pasty form, then it rapidly crystallizes. It is pressed and dried as in Example 11. The yield is good.

25 parts by weight of the diazoamino compound thus obtained, titrating 35% of base of molecular weight 157.5, are mixed with 22 parts by weight of the 80% sodium salt of the o-anisidide of β-hydroxy-naphthoic acid. This mixture if pasted and printed as in the foregoing examples gives bluish red prints, either by treatment in neutral steam or by acid steaming, the tinctorial yield and the brightness of which are practically identical.

By replacing in the foregoing mixture, the 22 parts by weight of the sodium salt of the o-anisidide of β-hydroxy-naphthoic acid by 25 parts by weight of the sodium salt of the p-chloranilide of 2-hydroxy-carbazole-3-carboxylic acid, dark brown prints are obtained by the same sequence of treatments.

Example 13

17.8 parts by weight of the 100% hydrochloride of 4-chloro-2-amino-1-methyl-benzene are dissolved in 100 parts of hot water. 20 parts by volume of 20° Bé. hydrochloric acid and ice are added while stirring, then 14 parts by volume of a 50% by volume solution of sodium nitrite. The temperature is then 8–10° C. After 10 minutes stirring, the solution of the diazo compound is allowed to flow, at ordinary temperature, drop by drop, under the surface of the liquid of a well agitated solution prepared from 28 parts by weight of N-(2-carboxy-4-chlorophenyl)-glycine, 40 parts by weight of $Na_2CO_3$ and 200 parts of water. The diazo compound is rapidly absorbed. Towards the end of the flow the mixture is gradually rendered alkaline to thiazole yellow paper by the slow addition of 14 parts by volume of a 48° Bé. solution of caustic soda. A trace of insoluble products is eliminated by filtration and the sodium salt of the diazoamino derivative is precipitated by the addition of 200 parts by weight of solid caustic soda (total volume=500 parts). The product is precipitated at first in a slightly pasty form, then crystallizes rapidly. It is filtered, pressed and dried at a moderate temperature. The yield is of the order of 80%.

29 parts by weight of the diazoamino derivative thus obtained, titrating 25% of base of molecular weight 141.5, are mixed with 19 parts by weight of the sodium salt of the o-toluidide of β-hydroxy-naphthoic acid, titrating 80%, and 2 parts by weight of sodium sulphate. 5 gr. of this mixture are formed into a paste with 1 cc. of a solution of 35° Bé. caustic soda and 5 cc. of denatured alcohol. 20 cc. of water and 60 gr. of 10% starch-tragacanth thickener are added. The very homogeneous paste is printed on a cotton fabric. After printing it is dried, and passed into a Mather-Platt in neutral steam for a few minutes, soaped in boiling soap solution and dried. In this manner very rich and very bright yellowish red prints are obtained, substantially the same from the point of view of brightness and yield, as those obtained by passage into acid steam. In this latter case the development is complete at the end of 30 seconds or 1 minute.

By replacing in the foregoing mixture the 19 parts by weight of the sodium salt of the o-toluidide of β-hydroxy-naphthoic acid by 19.5 parts by weight of the o-phenetidide of the same acid (titrating 85%) very bright scarlet prints are obtained after the same sequence of operations. If 9.5 parts by weight of the diacetoacetyl derivative of tolidine are used, then bright yellow prints are obtained.

Example 14

16.4 parts by weight of the hydrochloride of m-chloraniline are diazotized under the same conditions as the preceding example. The preparation and the isolation of the diazoamino derivative are in all points identical with those described in Example 13. 28 parts by weight of the diazoamino derivative thus obtained, titrating 23% of base of molecular weight 127.5, are mixed intimately with 19 parts by weight of the sodium salt of the ortho-toluidide of β-hydroxy-naphthoic acid, titrating 80%, and 3 parts by weight of sodium benzenesulphonate. By preparing a printing paste as in the preceding example and printing it on cotton fabric, rich bright orange prints are obtained under the same conditions, by neutral steaming. If N-(2-carboxy-4-chlorophenyl)-glycine is replaced by N-(2-carboxy-5-chlorophenyl)-glycine, practically identical results are obtained.

Example 15

25.6 parts by weight of 6-amino-3-benzoyl-amino-1-methoxy-4-methylbenzene are diazotized with 25 parts by volume of 20° Bé. hydrochloric acid and 7 parts by weight of NaNO₂, at a temperature of 10–15° C. The solution of the diazo compound obtained is allowed to flow slowly, under the surface of the liquid of a solution prepared from 32 parts by weight of N-(2-carboxy-4:6-dichlorophenyl)-glycine, 40 parts by weight of Na₂CO₃ and 200 parts of water. The temperature is kept between 0° C. and 5° C. In the course of the flow of the diazo compound, soda lye is added gradually so that the solution is never alkaline to thiazole yellow paper. It is then made sharply alkaline and moderately salted out with 50 parts by weight of sodium chloride (total volume=700 parts). The compound is filtered, pressed, and dried under vacuum at a moderate temperature.

20 parts by weight of the diazoamino derivative thus obtained, and including 6.5 parts by weight of base of molecular weight 256, are mixed with 8.5 parts by weight of the 80% sodium salt of the anilide of β-hydroxy-naphthoic acid.

A printing paste is prepared with 5 gr. of this mixture as in Example 13, and it is printed on cotton or rayon fabric and dried in the usual conditions. A passage for 3 minutes in neutral steam in a Mather-Platt completely suffices to develop a very intense violet colour. It may also be steamed for 1 minute in acid vapour and a practically identical result is obtained.

By replacing the 25.6 parts by weight of 6-amino-3-benzoylamino-1-methoxy-4-methylbenzene by 27.6 parts by weight of 1-chloro-6-amino-3-benzoylamino-4-methoxybenzene, and operating under the same conditions, a diazoamino derivative is obtained, which mixed in equi-molecular quantity with the 4'-methoxy-2'-methyl-anilide of β-hydroxy-naphthoic acid, allows dark corinth coloured prints to be obtained by the same sequence of operations as before by neutral steaming in a Mather-Platt.

Example 16

30 parts by weight of 4-amino-1-benzoylamino-2:5-diethoxy-benzene are diazotized in the usual manner with 25 parts by volume of 20° Bé. hydrochloric acid and 7 parts by weight of NaNO₂, at a temperature of 0–5° C. The solution of the diazo compound is then allowed to flow slowly, under the surface of the liquid of a solution prepared from 35 parts by weight of N-(2-carboxy-4-methoxyphenyl)glycine, 50 parts by weight of Na₂CO₃ and 300 parts of iced water.

The diazo compound is well absorbed. At the end of the flow the product is gradually made alkaline with dilute caustic soda until there is an alkaline reaction to thiazole yellow paper. The diazoamino derivative which results therefrom is precipitated by the progressive addition of solid caustic soda. The crystals are filtered, pressed and dried at a moderate temperature under vacuum.

The N-(2-carboxy-4-methoxyphenyl)-glycine used may be prepared by the condensation of 2-amino-5-methoxy benzoic acid with monochloracetic acid.

By admixture of this diazoamino derivative with the anilide of β-hydroxy-naphthoic acid for example, there can be obtained, by pasting with caustic soda, alcohol and a thickener, and by printing, drying and steaming in a neutral medium, intense dark blue shades, the tinctorial yield of which is identical with that obtained by development in acid steam.

Example 17

A mixture of 7.2 parts by weight of the diazo-amino derivative obtained by the condensation of diazotized 4-chloro-2-amino-1-methyl-benzene with N-(dihydroxypropyl)-2-amino-benzoic acid according to the method of Example 12 of the above mentioned patent application, and containing 20% of 4-chloro-2-amino-1-methyl-benzene, with 3.3 parts by weight of the sodium salt of the anilide of β-hydroxy-naphthoic acid (titrating 80% of free hydroxy-derivative), is dissolved in 10 parts by weight of ethanol and 50 parts of water. 3 parts by weight of a solution of caustic soda (48° Bé.) is added and the mixture is formed into a paste with 120 parts by weight of thickener of 10% tragacanth. This composition is printed on a cotton fabric, it is dried and developed by a passage for 7 minutes in a Mather-Platt in neutral steam. It is boiled in a bath of carbonated soap, rinsed and dried. Bright red prints of an excellent fastness are obtained in this manner.

Example 18

The diazoamino derivative obtained by the condensation of diazotized 1-amino-4-benzoylamino-2-methoxy-5-methyl-benzene with N-(dihydroxypropyl)-2-amino-benzoic acid according to the method of Example 18 of the above-mentioned patent application, is mixed in equi-molecular proportions with the sodium salt of the anilide of β-hydroxynaphthoic acid, and, starting with this mixture, a printing paste is prepared as in Example 17. This paste is printed on a cotton fabric, and developed by simple steaming for from 5–10 minutes in neutral steam. Violet prints are thus obtained.

Example 19

10.7 parts by weight of p-toluidine (100%) are dissolved in 50 parts of water and 30 parts by volume of concentrated hydrochloric acid. Ice is added and the amine is diazotized by the addition of 14 parts by volume of a 50% NaNO₂ solution, without exceeding a temperature 5° C. The diazo solution is allowed to flow, in 1 hour, under the surface of the liquid of a solution containing 37 parts by weight of the disodium salt of N - (2' - hydroxy - 3' - sulphopropyl) - 2 - amino - 5-chloro-benzoic acid of formula:

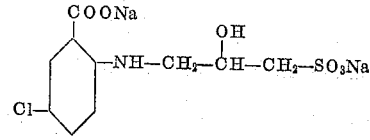

25 parts by weight of anhydrous sodium carbonate and 200 parts of water. The reaction is carried out at 15–18° C. 14 parts by volume of a 50% solution of 48° Bé. caustic soda are allowed to flow in simultaneously. When all the diazo compound has been absorbed, a trace of insoluble material is filtered off, and 100 parts by weight of solid caustic soda are added to the filtrate. An oil is precipitated which gradually crystallizes. It is filtered, pressed, and dried under vacuum at a moderate temperature.

The N - (2' - hydroxy - 3' - sulphopropyl) - 2-amino-5-chloro-benzoic acid of which the disodium salt is used may be prepared as follows: 86 parts by weight of 5-chloro-2-amino-benzoic acid are dissolved in 750 parts of water and 30 parts by volume of a 48° Bé. caustic soda solution. 120 parts by weight of the sodium salt of 1-chloro-2-hydroxy-propane-3-sulphonic acid are added and the mixture is heated to 100° C. while stirring. Weak alkalinity to β-yellow paper is maintained by adding slowly 40 parts by volume of a 48° Bé. solution of caustic soda. At the end of 3 hours heating, a further 15 parts by weight of the sodium salt of 1-chloro-2-hydroxy-propane-3-sulphonic acid are added and 5 parts by volume of a 48° Bé. solution of caustic soda are introduced slowly. The heating is kept up for 3 hours, then the mixture is allowed to cool and is acidified with acetic acid, which brings about the extensive precipitation of the desired condensation product. After filtration, pressing and drying at 100° C., 120 parts by weight of dry product are obtained the composition of which, determined by analysis after recrystallisation in boiling water, corresponds to the formula $C_{10}H_{11}O_6NClSNa+H_2O$.

This diazoamino derivative mixed, in equimolecular proportions, with the sodium salt of the p-chloranilide of 2-hydroxy-carbazole-3-carboxylic acid yields brown shades by printing and development in neutral steam.

*Example 20*

When used under the same conditions as in Example 17, the diazoamino derivative resulting from the condensation of diazotized 4-chloro-2-amino-1-methyl-benzene with N-(2'-carboxyphenyl)-β-amino-propionic acid according to the method of Example 19 of the above mentioned patent application, gives an equivalent result.

*Example 21*

19.4 parts by weight of 100% hydrochloride of 4-chloro-2-amino-1-methoxy-benzene are dissolved in 100 parts of warm water. Ice is added, then 20 parts by volume of concentrated hydrochloric acid, and the amine is diazotized by the addition of 14 parts by volume of a 50% by volume solution of $NaNO_2$. The diazo compound is introduced, in 15 minutes, between 0° C. and 5° C., under the surface of the liquid of a solution made from 30 parts by weight of N-(2'-carboxy-4'-chlorophenyl)-β-amino-propionic acid, 200 parts of water and 44 parts by weight of anhydrous sodium carbonate. Towards the middle of the flow, 14 parts by volume of a 48° Bé. solution of caustic soda are carefully introduced simultaneously. When all the diazo compound has been absorbed, 150 parts by weight of solid caustic soda are added, then 300 parts of saturated brine. The mixture is kept stirred for 2 hours at 5–10° C., the diazoamino derivative thus obtained is filtered, pressed and dried in vacuo at 40° C. The yield is 84%.

When used as in the foregoing examples, this diazoamino derivative yields by simple development in neutral steam, bluish red prints of excellent fastness.

The N-(2'-carboxy-4'-chlorophenyl)-β-aminopropionic acid used may be prepared by the condensation of 5-chloro-2-amino-benzoic acid with β-chloropropionic acid according to a process identical with that described in the last paragraph of Example 19 of the above-mentioned patent application for the preparation of N-(2'-carboxyphenyl)-β-amino-propionic acid. Recrystallised from alcohol, it has a M.P. of 191–192° C.

*Example 22*

The diazoamino derivative resulting from the condensation of the diazo derivative of the amino-azotoluene derived from ortho-toluidine with N-(2-carboxyphenyl)-glycine according to the method of Example 6 of the above-mentioned patent application is mixed, in equimolecular proportion, with the sodium salt of the anilide of β-hydroxy-naphthoic acid, and starting from this mixture, a printing paste is prepared as in Example 17. This paste is printed on a cotton fabric and developed by simple passage in neutral steam. Prints of rich bordeaux colour of good fastness are thus obtained.

*Example 23*

A diazoamino derivative endowed with the same properties as that described in Example 22 is obtained by using N-(2-carboxy-5-chlorophenyl)-glycine as stabilizer in place of N-(2-carboxyphenyl)-glycine.

*Example 24*

If the diazoamino compound resulting from the condensation of the diazo compound of the aminoazotoluene derived from m-toluidine with N-(2-carboxyphenyl)-glycine according to the method of Example 7 of the above-mentioned patent application, is used under the conditions of Example 22 then a rich bordeaux tint is obtained by simple neutral steaming.

*Example 25*

The diazoamino derivative resulting from the condensation of the diazo compound of the aminoazo compound mentioned in Example 8 of the above-mentioned patent application with N-(2-carboxyphenyl)-glycine according to the method of this same example, is mixed, in equimolecular proportions, with the sodium salt of the anilide of β-hydroxy-naphthoic acid, and a printing paste is prepared from this mixture as in Example 17. This paste is printed on a cotton fabric and developed by simple passage in neutral steam. Navy blue prints of excellent fastness are thus obtained.

*Example 26*

A diazoamino compound of equivalent properties is obtained by using N-(2-carboxy-5-chlorophenyl)-glycine as stabiliser in Example 25 in place of N-(2-carboxyphenyl)-glycine.

*Example 27*

When used under the same conditions as in Example 25, the diazoamino derivative resulting from the condensation of diazotized 4'-nitro-4-amino-2:5-dimethoxy-azobenzene with N-(2-carboxyphenyl)-glycine according to the method of Example 9 of the above-mentioned patent application, furnishes, according to the concentration, navy blues or blacks of excellent fastness by simple neutral steaming.

*Example 28*

5.2 parts by weight of the diazoamino derivative obtained by the condensation of the diazo compound of the aminoazo compound of the formula:

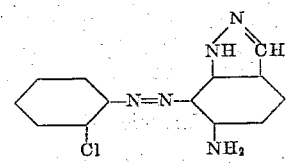

with N-(2-carboxyphenyl)-glycine according to the method of Example 10 of the above-mentioned patent application, and 2.9 parts by weight of the sodium salt of the anilide of β-hydroxy-naphthoic acid are dissolved in a mixture of 50 parts of water, 10 parts by weight of ethyl alcohol, and 3 parts by weight of 48° Bé. NaOH; when the solution is complete, it is mixed with a thickener containing 10% of gum tragacanth.

This composition gives a brown red of very good fastness on printing, drying, and development for 7–8 minutes in neutral steam.

*Example 29*

5.2 parts by weight of the diazoamino derivative described in Example 10 of the above-mentioned patent application, and 2.9 parts by weight of the sodium salt of the anilide of β-hydroxy-naphthoic acid are dissolved in a solution formed previously from 3 parts by weight of $CuSO_4.5H_2O$, 50 parts of water, 2 parts by weight of monoethanolamine, 10 parts by weight of alcohol, and 3 parts by weight of 48° Bé. NaOH. The perfectly clear solution is formed into a paste with 120 parts by weight of a thickener containing 10% of gum tragacanth.

This composition printed, dried and developed for 7–8 minutes in neutral steam, yields a dark negro head brown of excellent fastness.

*Example 30*

By using, under the same conditions as in Example 27, the diazoamino derivative resulting from the condensation of the diazo compound of 2′-nitro-4-amino-5-methoxy - 2:4′ - dimethyl - azobenzene with N - (2 - carboxyphenyl)-glycine according to the method of Example 11 of the above-mentioned patent application, corinth coloured prints of excellent fastness are obtained by simple neutral steaming.

*Example 31*

5.7 parts by weight of the diazoamino derivative, titrating 27.1% of base of molecular weight 141.5, obtained by the condensation of diazotised 4-chloro-2-amino-1-methylbenzene with N-(2-carboxyphenyl)-glycine-ethyl-ester according to the method of Example 12 of the above-mentioned patent application, are mixed with 3.7 parts by weight of the sodium salt of the o-toluidide of β-hydroxynaphthoic acid (84.5% of arylide reckoned in the free state). A printing paste is prepared by pasting 5 gr. of this mixture with 1.5 gr. of a 35° Bé. solution of caustic soda, 1 gr. of sodium chlorate, 5 cc. of denatured alcohol, 20 cc. of water and 40 gr. of neutral starch-tragacanth thickener. Then, this paste is printed on a cotton fabric, dried and steamed for 3–4 minutes in neutral steam. After soaping, rinsing and drying, intense bright red prints are obtained. They can also be developed in acetic acid vapour. The tinctorial yields are the same in both cases.

*Example 32*

The diazoamino derivative obtained by the condensation of diazotized 4-chloro-2-amino-1-methyl-benzene with N-(2-carboxyphenyl)-glycinamide according to the method of Example 13 of the above-mentioned patent application, is mixed, in equimolecular proportions, with arylides of β-hydroxy-naphthoic acid. Products are thus obtained, which by printing on cotton fabric, in the usual conditions, may be developed in neutral or acid steam.

*Example 33*

The diazoamino derivative resulting from the condensation of diazotized 6-amino-3-benzoylamino-1-methoxy-4-methyl-benzene with N-ethylanthranilic acid according to the method of Example 20 of the above-mentioned patent application is mixed, in equimolecular proportions, with the sodium salt of the anilide of β-hydroxy-naphthoic acid, and a printing paste is prepared from this mixture as in Example 17. This paste is printed on a cotton fabric and it is developed by simple passage in neutral steam. Violet prints are thus obtained.

*Example 34*

25 parts by weight of the diazoamino derivative obtained by the condensation of diazotized 6-amino-3-benzoylamino - 1 - methoxy - 4 - methyl-benzene with N-methyl-anthranilic acid according to the method of Example 21 of the above-mentioned patent application, titrating 30% of base of molecular weight 256, are mixed intimately with 10 parts by weight of the sodium salt of the anilide of β-hydroxy-naphthoic acid (80% of free acid). 10 gr. of this mixture are formed into a paste with 10 cc. of denatured alcohol, 5 cc. of 35° Bé. solution of caustic soda, 50 cc. of water and 100 gr. of starch-tragacanth thickener. A cotton fabric is printed with this paste under the usual conditions, the fabric is dried, and the colour developed by passage for some minutes in a Mather-Platt in neutral steam. The fabric is soaped, rinsed and dried. The tinctorial yield is the same as that obtained in the conditions used up to the present by acid development.

*Example 35*

110 parts of 1-amino-5-dimethylsulphamido-2-methylbenzene are formed into a paste with 150 parts of water and 150 parts of 20° Bé. hydrochloric acid. After stirring for one hour 350 parts of ice are added and diazotization is effected by allowing the mixture to flow in a quarter of an hour, into a solution prepared from 35 parts of sodium nitrate and 50 parts of water. After filtration the diazo solution is allowed to flow, in half an hour, under the surface of the liquid, into a cold solution prepared from 150 parts of 5-bromo-2-hydroxyethyl-amino-benzoic acid, 1200 parts of water, sufficient caustic soda to obtain a slight alkaline reaction on thiazole yellow paper and finally 130 parts of sodium carbonate. The diazoamino derivative is precipitated at first in a very voluminous form, and the dense crystals separate gradually by simple stirring. The crystals are filtered, pressed and dried at a moderate temperature. The yield is 90%.

63 parts of the diazoamino derivative thus prepared containing 19 parts of the base calculated on a molecular weight of 214 are mixed with 37 parts of the sodium salt of the o-phenetidide of 2-hydroxy-3-carboxy-naphthalene, titrating 78.7% of free arylide of molecular weight 307. 60 parts of this mixture are formed into a paste with 35 parts of denatured alcohol and 5 parts of 35° Bé. caustic soda solution. The product is dissolved by adding 150 parts of warm water, and the preparation of the printing paste is finished by incorporating 500 parts of 8% starch-tragacanth thickener. The paste is printed on cotton fabric, which is then dried, and steamed in a Mather-Platt for 5–6 minutes in neutral steam. The fabric is then soaped, rinsed and dried and a brilliant and very fast orange shade is obtained. Acid steaming does not give a better tinctorial yield.

*Example 36*

47 parts of the compound prepared according to Example 35 and containing 17.2 parts of base calculated on a molecular weight of 214, are mixed with 36 parts of the sodium salt of the (4′-methoxy-2′-methyl)anilide of 2-hydroxy-3-carboxy-naphthalene, containing 28 parts of the arylide calculated on a molecular weight of 307, and 17 parts of sodium sulphate.

10 parts of this mixture are formed into a paste with 0.5 part of 35° Bé. caustic soda, 6 parts by weight of a product known on the market as "Solutene CI" and 6 parts of sodium m-nitrobenzene sulphonate. "Solutene CI" is formed of thiodiglycol and is present as a solvent. 40 parts of warm water and 80 parts of starch-tragacanth thickener are added and the paste is printed on a cotton fabric. The fabric is then dried, steamed for 7–8 minutes in saturated neutral steam, without any kind of developing agent. After the customary subsequent treatments a very fast full red shade is obtained.

*Example 37*

130 parts of 2-amino-4-diethylsulphamido-1-methoxy-benzene are formed into a paste with 350 parts of water and 150 parts of 20° Bé. hydrochloric acid. After stirring for half an hour 200 parts of ice are added. Diazotization is then effected by allowing the mixture to flow, in a quarter of an hour, into a solution prepared from 35 parts of sodium nitrite dissolved in 50 parts of water. After being stirred for one hour the mixture is filtered to eliminate small amounts of insoluble matter. The diazo-solution is allowed to flow, in half an hour, under the surface of the liquid, into a solution prepared as in Example 35 from 150 parts of 5-bromo-2-hydroxyethyl-amino-benzoic acid. The solution is energetically stirred and the absorption of the diazo compound is very rapid. At the end of the flow the mixture is made alkaline with 200 parts of 30% by weight soda solution and the temperature is raised to 50° C. The mixture is salted out with 200 parts of common salt. The diazoamino derivative is precipitated, at first in a pasty, and then in a crystalline, form. After cooling the crystals are filtered, pressed and dried at moderate temperature. The yield exceeds 90%.

By replacing the diazo derivative used in the printing paste of Example 35, by that prepared from 2-amino-4-diethylsulphamido-1-methoxy-benzene a very fast full red shade is obtained on a cotton fabric.

Example 38

85 parts of 5-chloro-1-amino-2-methyl-benzene are introduced while stirring into a mixture of 180 parts of 20° Bé. hydrochloric acid and 600 parts of water. The mixture cooled to 0–5° C. and a solution of 43 parts of sodium nitrite in 100 parts of water is introduced in a quarter of an hour. After stirring for one hour the mixture is filtered to remove small amounts of insoluble matter. A solution of the stabilizer is prepared from 190 parts of N-(2-carboxy-4:6-dichlorophenyl)glycine, 1200 parts of water, 120 parts of 35° Bé. caustic soda solution and 210 parts of anhydrous sodium carbonate. This solution is cooled externally with brine. The diazo solution is allowed to flow into this solution under the surface of the liquid, while stirring. The temperature should not exceed 5–8° C. The absorption of the diazo compound is very rapid. When all the solution has been introduced the mixture is made distinctly alkaline with about 250 parts of 35° Bé. caustic soda. The solution obtained can be clarified if desired with animal charcoal. 120 parts of flake caustic soda are added to the filtrate and then, gradually with good agitation, 600 parts of sodium chloride. The diazoamino derivative is precipitated in very beautiful, almost colourless, small leaves. After stirring for one hour the mixture is filtered, pressed and dried at a moderate temperature and preferably in vacuo. The yield exceeds 80%.

By replacing the 5-chloro-1-amino-2-methyl-benzene by 4-chloro-1-amino-2-methylbenzene, and operating exactly under the same conditions, the corresponding diazoamino derivative is obtained in good yield.

54 parts of the diazoamino derivative of 5-chloro-1-amino-2-methyl-benzene thus prepared, and containing 14.1 parts of base of a molecular weight 141.5, are mixed with 40 parts of the sodium salt of the o-phenetidide of 2-hydroxy-3-carboxy-naphthalene, containing 32 parts of this arylide calculated as free acid of molecular weight 307.

10 parts of this mixture are formed into a paste with 5 parts of "Solutene CI," 0.8 part of 35° Bé. caustic soda solution, 3 parts of sodium chlorate and 5 parts of sodium m-nitrobenzene sulphonate. 40 parts of hot water are added and then 110 parts of starch-tragacanth thickener previously neutralized.

This very homogeneous paste is printed on a cotton fabric which is then dried in the usual manner, and subjected to seaming in a neutral saturated atmosphere in a Mather-Platt. A passage of 3–7 minutes suffices to develop the colour without addition of any kind. After washing in a boiling solution, containing 2 gms. of soap and 2 gms. of sodium carbonate per litre, rinsing and drying, an extremely full and brilliant scarlet tint is obtained. The tinctorial yield is identical with that obtained when one steams in presence of volatile organic acids, such as formic or acetic acid.

Example 39

54 parts of the diazomino derivative used in the foregoing example are mixed with 41 parts of the sodium salt of the o-toluidide of 2-hydroxy-3-carboxy naphthalene containing 29 parts of this arylide calculated on a molecular weight of 277. A printing paste is prepared as in Example 38 and after the treatments indicated in Example 38 a very full and very bright red shade is obtained. The tinctorial yield and brightness are identical if steaming takes place in a neutral or acid atmosphere. By simple treatment in a warm and moist atmosphere, preferably in sunlight, an almost quantitative tinctorial yield is obtained.

Example 40

50 parts of the diazoamino derivative of 4-chloro-1-amino-2-methyl-benzene and of N-(2-carboxy-4:6-dichloro-phenyl)glycine, containing 12 parts of base calculated on a molecular weight of 141.5, are mixed with 20 parts of the acetoacetyl derivative of 4-chloro-1-amino-2:5-dimethoxy-benzene. 10 parts of this mixture are formed into paste with 2 parts of 35° Bé. soda lye and 5 parts of "Solutene CI" 30 parts of hot water are added and then 120 parts of starch-tragacanth thickener. The paste thus obtained is printed on a cotton fabric which is then dried and steamed for several minutes in a Mather-Platt in neutral saturated steam. The fabric is washed, soaped in the usual manner and dried.

A very bright yellow tint is obtained. The tinctorial yield is at least equal to that obtained by steaming in an acid atmosphere.

Example 41

54 parts of 1-amino-5-dimethylsulphamido-2-methyl-benzene in 75 parts of 20° Bé. hydrochloric acid and 75 parts of water are stirred for one hour. 200 parts of ice are then added and diazotization is effected with 18 parts of sodium nitrite dissolved in 30 parts of water. After stirring for one hour small quantities of impurities are eliminated by filtration. The diazo solution is allowed to flow, under the surface of the liquid, while stirring and maintaining the temperature below 5° C., into a stabilizer solution prepared from 90 parts of N-(2-carboxy-4-bromo-phenyl)glycine, 500 parts of water and 80 parts of sodium carbonate. The absorption is very rapid. The mixture is filtered, if necessary with the addition of a little decolorizing carbon, and the compound is precipitated by adding gradually 300 parts of flake soda. The crystals obtained are filtered, pressed and dried at a moderate temperature. The yield is 80%.

64 parts of the diazoamino derivative thus prepared, and containing 18 parts of base calculated on a molecular weight of 214, are mixed with 40 parts of the sodium salt of the o-phenetidide of 2-hydroxy-3-carboxy naphthalene, containing 28 parts of the arylide calculated on a molecular weight of 307. 10 parts of this mixture are formed into a paste with 6 parts of "Solutene CI," 0.4 part of 35° Bé. soda lye, and 5 parts of sodium m-nitrobenzene sulphonate. 30 parts of warm water and 100 parts of neutralised starch-tragacanth thickener are added. It is printed on a fabric, the fabric is dried and steamed for 5–6 minutes in a neutral saturated atmosphere. The fabric is then washed, soaped, rinsed and dried in the usual manner and a very bright and full orange shade is obtained.

Example 42

31.5 parts of 5-chloro-1-amino-2-methoxy-benzene are introduced gradually, with good agitation, into a mixture of 200 parts of water and 60 parts of 20° Bé. hydrochloric acid. After stirring for one hour, with external cooling by a brine bath, the mixture is diazotized in the usual manner with 14 parts of sodium nitrite dissolved in 20 parts of water. The mixture is stirred for one hour and allowed to flow, under the surface of the liquid and while stirring, into a solution kept at 0–8° C. and prepared from 65 parts of N-(2-carboxy - 4:6 - dichlorophenyl)glycine, 400 parts of water, 40 parts of 35° Bé. caustic soda lye, and 70 parts of anhydrous sodium carbonate. The flow lasts about an hour. The absorption of the diazo compound is very rapid. The mixture is made distinctly alkaline to thiazole yellow paper, with 85 parts of 35° Bé. caustic soda. The solution is clarified with decolorizing carbon, and the diazoamino derivative is precipitated by the slow addition of 100 parts of flake caustic soda, and 100 parts of sodium chloride. After stirring for one hour the precipitate is filtered, drained, pressed out and dried at a moderate temperature. The yield is 80%.

25 parts by weight of the diazoamino derivative thus obtained, titrating 35% of base of molecular weight 157.5, are mixed with 2 parts by weight of the 80% sodium salt of the o-anisidide of 2-hydroxy-3-carboxy-naphthalene, this mixture is formed into a paste and printed on cotton as in the foregoing examples and one obtains either by treatment in neutral steam, or by acid steaming prints of a bluish-red shade.

*Example 43*

176 parts of 1-amino-2-methyl-4:5-dichlorobenzene are dissolved in 500 parts of water and 250 parts by volume of 20° Bé. hydrochloric acid. After addition of 400 parts of ice, diazotisation is effected with 70 parts of sodium nitrite added gradually whilst maintaining the temperature in the region of 10° C. Filtering is effected to eliminate small quantities of impurities. The solution of the diazo derivative is slowly poured under the surface of the liquid into a solution of stabilizer prepared with 320 parts of N-(2-carboxy-4:6-dichlorophenyl)glycine, 250 parts of sodium carbonate, 1200 parts of water and sufficient ice to keep the temperature at 0° C. This addition is effected in the space of 1 hour. When the coupling is terminated, the mixture is rendered alkaline with caustic soda up to a clear reaction on thiazole yellow paper and the mixture is filtered. 200 parts of solid caustic soda in flakes are added. The temperature rises to approximately 30° C. 900 parts of common salt are then added. After a few hours of stirring, the crystals are filtered, exposed to air, pressed and dried at a temperature of 50–55° C. The yield in diazo-amino compound reaches 90%.

A product is obtained having similar properties by replacing the N-(2-carboxy-4:6-dichlorophenyl)glycine by N-(2-carboxy-4-chlorophenyl)glycine or by N-(2-carboxy-4-bromophenyl)glycine.

7.5 parts by weight of the diazoamino derivative of N-(2-carboxy - 4:5 - dichlorophenyl)glycine obtained as above and titrating 23.5% of base of molecular weight 176 and 3.1 parts of o-phenetidide of β-hydroxy-naphthoic acid are made into a paste in 10 parts by volume of ethyl alcohol and 1.8 parts by weight of 35° Bé. caustic soda solution. The mixture is dissolved with 25 parts of hot water and brought to a total of 150 parts by weight with starch-tragacanth thickener.

The paste thus obtained is printed on cotton fabric. After drying, steaming is effected in neutral steam for some minutes at a temperature of about 100–102° C. After washing, soaping and rinsing, a very bright scarlet is obtained of excellent fastness.

*Example 44*

By replacing, in Example 43, the 3.1 parts of o-phenetidide of β-hydroxy-npahthoic acid by 3 parts of the o-anisidide of the same acid and by working in the same manner a very fast bright red is obtained.

We claim:

1. Process of printing a material selected from the group consisting of natural and regenerated cellulosic material which comprises applying a printing paste containing at least one coupling component and a water soluble salt of a diazoamino derivative selected from those having the general formula:

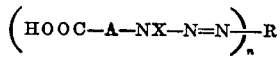

in which A represents a member selected from the group consisting of the halogen substituted o-phenylene group, the alkyl substituted o-phenylene group, and the alkoxy substituted o-phenylene group, X represents a carboxy substituted alkyl, n represents a positive integer from 1 to 2, and R represents the radical of an aromatic amine having a more strongly basic character than 2:5-dichloraniline, and in developing the dyestuff by neutral steaming.

2. Process as claimed in claim 1 in which the diazoamino derivative has the following general formula:

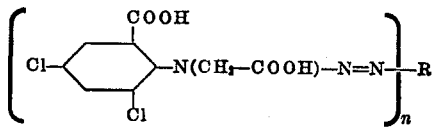

wherein n and R have the meanings given in claim 1.

3. Process as claimed in claim 2 in which the diazoamino derivative has the following formula:

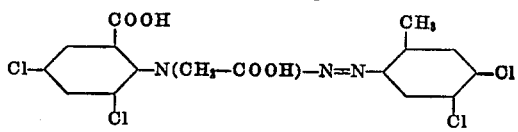

4. Process as claimed in claim 1 in which the diazoamino derivative has the following general formula:

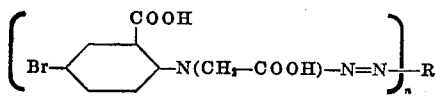

wherein n and R have the meanings given in claim 1.

5. Process as claimed in claim 4 in which the diazoamino derivative has the following formula:

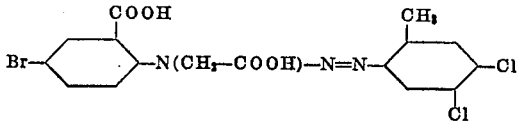

6. A mixture of a coupling component with a water-soluble salt of a diazoamino derivative selected from those having the general formula:

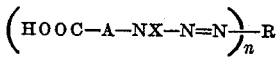

in which A represents a member selected from the group consisting of the halogen substituted o-phenylene group, the alkyl substituted o-phenylene group, and the alkoxy substituted o-phenylene group, X represents a carboxy substituted alkyl, n represents a positive integer from 1 to 2, and R represents the radical of an aromatic amine having a more strongly basic character than 2:5-dichloraniline.

7. A mixture as claimed in claim 6 in which the diazoamino derivative has the following general formula:

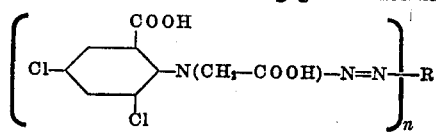

wherein n and R have the meanings given in claim 6.

8. A mixture as claimed in claim 7 in which the diazoamino derivative has the following formula:

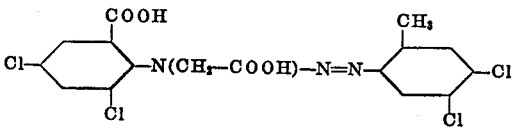

9. A mixture as claimed in claim 6 in which the diazoamino derivative has the following general formula:

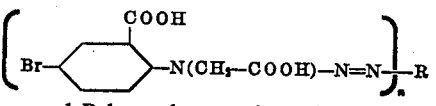

wherein n and R have the meanings given in claim 6.

10. A mixture as claimed in claim 9 in which the diazoamino derivative has the following formula:
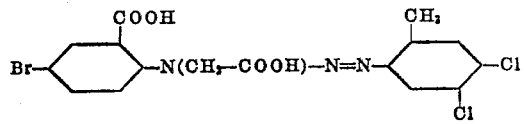
References Cited in the file of this patent
UNITED STATES PATENTS
2,338,639 Heaton _____ Jan. 4, 1944
2,522,838 Petitcolas _____ Sept. 19, 1950
OTHER REFERENCES
"Chem. Techn. of Dyeing and Printing," by L. Diserens, transl. by Wengraf and Baumann, Reinhold Publ. Co., N.Y.C., vol. 1, 1948, pp. 304, 305, 316.